Feb. 8, 1938. T. CHESTER Re. 20,650
METHOD OF AIR CONDITIONING
Original Filed Jan. 30, 1928
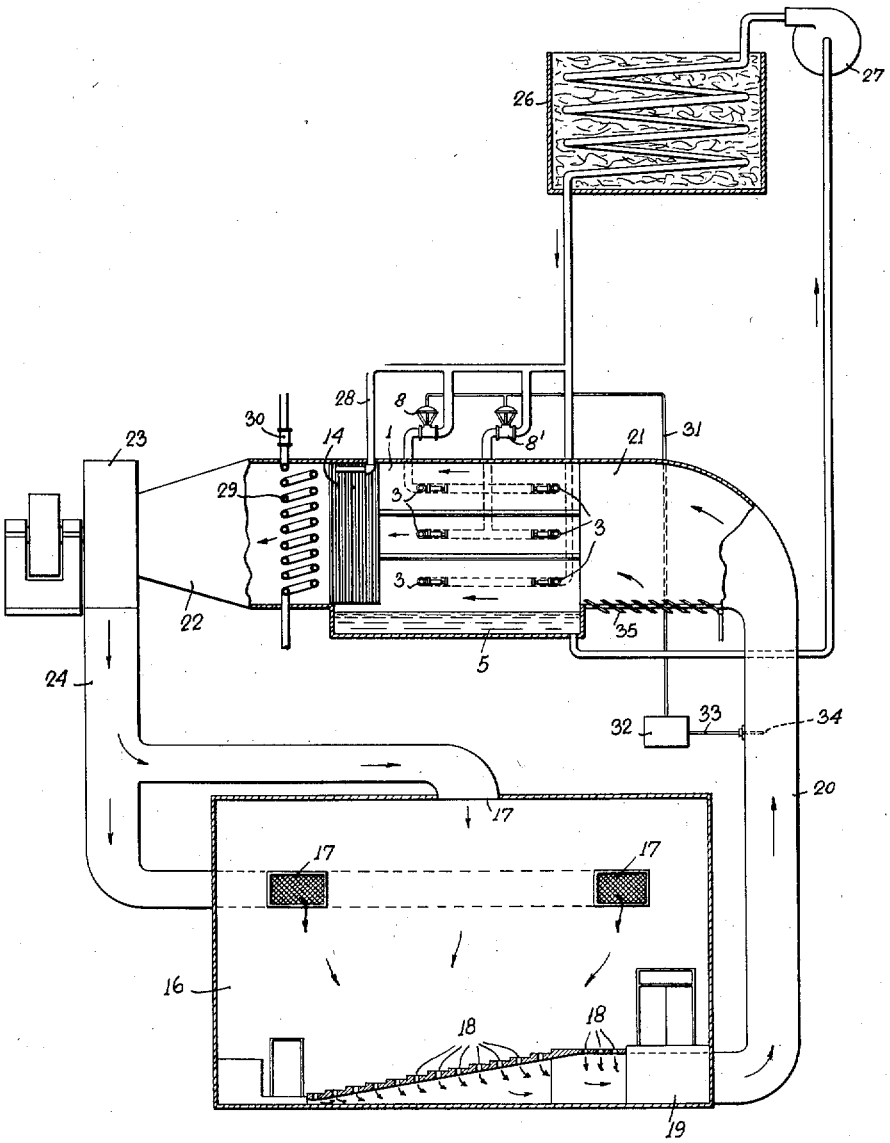
INVENTOR.
THOMAS CHESTER,
BY Herman Seid
ATTORNEY.

Reissued Feb. 8, 1938

Re. 20,650

UNITED STATES PATENT OFFICE 20,650

METHOD OF AIR CONDITIONING

Thomas Chester, Detroit, Mich.

Original No. 1,988,264, dated January 15, 1935, Serial No. 510,349, January 22, 1931, which is a division of application January 30, 1928, Serial No. 250,489, now Patent No. 1,791,751, dated February 10, 1931. Application for reissue August 31, 1935, Serial No. 38,811

13 Claims. (Cl. 261—115)

This invention relates to air conditioning and ventilating systems such as are employed for artificially maintaining predetermined atmospheric conditions in enclosure structures such as auditoriums, and work rooms in certain industries.

This application is a division of my copending application, Serial No. 250,489, filed January 30, 1928, which has matured into Patent 1,791,751, issued February 10, 1931, wherein is shown a novel form of dehumidifier or cooler. The present invention takes advantage of the possibilities of such dehumidifier or cooler, to provide a method of air conditioning which may be practiced with higher operating efficiencies than heretofore obtained.

It is old in the art to cause two streams of air, one drawn from the outside atmosphere, and the other drawn from the ventilated enclosure, to flow simultaneously through treating apparatus, for the purpose of adding heat to the air or conversely abstracting heat from the air. This addition or abstraction covers both sensible and latent heat. The method disclosed in this application shows how sensible heat in the air taken from either or both of the two sources mentioned, can be utilized for the purpose of varying the dry-bulb temperature of the air leaving the treating apparatus without the subsequent addition or introduction of any other stream of air.

Briefly, the invention embraces the provision of a stream of air recirculated from and to the enclosure, adding to said stream fresh air in an amount sufficient to maintain a suitable quality of air in the enclosure, modifying the dewpoint of the fresh air portion of the united stream and when required modifying also the dewpoint of a portion of the united stream which consists of a mixture of fresh and recirculated air, and cleaning the entire stream before its entry into the enclosure. By such method it will be apparent that all of the air which enters the enclosure from the conditioning system, will have been cleaned, yet dewpoint adjustment or cooling may be made only to so much of the air as is necessary. The method is of extreme simplicity, as is the apparatus necessary therefor.

The exact nature of this invention, together with further objects and advantages thereof will be apparent from the following description taken in connection with the accompanying drawing, which is a conventionalized and diagrammatic showing of an air conditioning system set up for operation according to my method.

In the drawing, 16 is an auditorium, the air of which is to be conditioned. Air supply inlets 17 are appropriately arranged as in the walls and ceiling, and air extraction outlets 18 are arranged as in the floor thereof and lead to a master outlet 19.

A dehumidifier or cooler indicated at 1 is provided, and arrangement is made to circulate air from the outlet 19 through the conduit 20 which has a suction chamber 21 communicating with the dehumidifier or cooler, thence by way of the conduit portion 22, through the blower 23, conduit 24, to the inlets 17. Flow is thus maintained in the system as indicated by the arrows.

The dehumidifier or cooler indicated is provided with spray nozzles 3, arranged in three horizontal zones the upper two of which are controlled as by the diaphragm valves 8, 8′, as indicated by the piping appearing in broken lines. In the assembly shown, the nozzles are supplied by water cooled in a refrigerating system indicated conventionally as at 26, circulation from the tank 5 through the refrigerator means 26 and the dehumidifier or cooler being maintained by a pump 27.

Scrubber baffle plates 14 are provided as indicated, supplied with water as from the pipe 28. Beyond the scrubber or eliminator 14 in the direction of flow is a heating coil 29 controlled by a valve 30.

The valves 8 and 8′ are arranged for automatic control as through an air line 31, the compressed air supply to which is controlled by a relay 32 which in turn has connection as by small compressed air pipe 33 with an instrument 34, which may be a hygrostat, or thermostat in the path of the return air. The spring of the valve 8 is formed or adjusted to be of less strength than that of the valve 8′ whereby valve 8′ will close only after closing the valve 8.

Fresh air may enter the enclosure structure from the outside atmosphere by infiltrations, through doors, windows, crevices, etc., to maintain a suitable standard of purity in the system. However, a louver damper 35 may be arranged in the wall of the suction chamber 21 adjacent the lowermost zone of the dehumidifier or cooler, the damper being shown in open position wherein outside air which enters therethrough is admitted to the recirculated air current. The damper 35 is arranged as described, that such outside air as is introduced into the system passes through the lowermost portion of the dehumidifier or cooler which is always effective for dehumidifying or cooling action, and this air is therefore conditioned as well as scrubbed.

The surplus part of the return air may be vented to the atmosphere through the various leakage crevices, or through a duct provided for this specific purpose.

In operation, the blower 23 maintains the air circulation indicated, and according to the humidity or temperature of the air in the return conduit 20 the upper portion of the dehumidifier or cooler will be operative or inoperative on the air passing therethrough. Whether or not dehumidifying or cooling action is had in the several zones depends upon whether or not the nozzles therein are functioning. This in turn depends upon opening of the valves 8. In the lowermost zone through which most of the fresh air passes spray is continuously maintained. Spray in the zones thereabove is had only dependent upon the humidity or temperature in the conduit 20, these zones automatically becoming operative in ascending order and inoperative in descending order.

The adjustment of the damper 35 may be automatic as will be well understood by one familiar with the art, or manual, so that a desired volume of fresh air will be added to the recirculating stream flowing through the conduit 20.

All of the united air stream passes through the dehumidifier or cooler without divergence or deviation of the stream but only so much as is necessary is dehumidified or cooled therein; and such dehumidified or cooled portion always includes more of the fresh air portion of the united stream than of the recirculated portion. On the other hand, the entire united air stream is cleaned by the scrubber 14. In other words, in the dehumidifier, the dewpoint of the fresh air portion of the united stream passing therethrough, is modified more than the mean dew point of the entire united stream is modified.

The net result is, therefore, that while a conditioned air supply is always had in the room, and this supply is always free from solid impurities, yet only the least necessary refrigerated water is used by the dehumidifier. Most of the fresh air introduced into the system is properly conditioned on its first pass through the dehumidifier or cooler and the cooperating apparatus of the system; the recirculated air being dehumidified or cooled only when necessary. A portion of the united air stream which consists of a mixture of fresh air and recirculated air is also either dehumidified or cooled only when necessary.

What I claim is:

1. The method of cooling and ventilating an enclosure comprising providing a recirculating stream of air from and to said enclosure, adding a stream of fresh air to said recirculating stream, and thereafter modifying the dewpoint of the fresh air portion of the united stream more than the mean dewpoint of the united stream is modified.

2. The method for the purpose described, comprising adding a fixed proportion of fresh air to a recirculating stream of air, and thereafter modifying the mean dewpoint of the united stream by cooling a fresh air portion thereof without substantially cooling a recirculating portion thereof.

3. The method of cooling and ventilating an enclosure comprising providing a recirculating stream of air from and to said enclosure, adding a stream of fresh air to said recirculating stream without mixing said streams, and thereafter modifying the mean dewpoint of the united stream, by cooling the fresh air portion thereof, and some of the recirculated portion thereof, without coincidentally materially cooling the remainder of said recirculated portion.

4. The method of cooling an enclosure comprising providing a recirculating stream of air from and to said enclosure, adding a stream of fresh air to said recirculating stream, and thereafter cooling the fresh air portion of the united stream to a lower temperature than that to which the recirculating stream is cooled, and utilizing the sensible heat of the recirculating stream for the purpose of raising the dry bulb temperature of the cooled fresh air portion, without the subsequent addition of any other stream of air.

5. The method of conditioning a stream of air of increasing humidity from one side to the other, comprising dehumidifying or cooling a unitary fractional part only of said stream on the relatively humid side thereof, and varying the sectional area of said part without substantially impeding the flow of any sectional part of said stream, to maintain a desired mean humidity standard for said stream.

6. The method for the purpose described, comprising adding fresh air to a recirculating stream of air, and thereafter modifying the mean dewpoint of the united stream by cooling a fresh air portion thereof without simultaneously substantially cooling a recirculating portion thereof.

7. The method of cooling and ventilating an enclosure, comprising providing a recirculating stream of air from and to said enclosure, adding a stream of fresh air to said recirculating stream without mixing said streams, thereafter modifying the mean dewpoint of the united stream by cooling the fresh air portion thereof and some of the recirculated portion thereof, without coincidentally cooling the remainder of said recirculated portion, and varying the volumetric amount of said portions of said united stream subjected to cooling, responsive to a condition of the air withdrawn from said enclosure.

8. The method of cooling the air contents of an enclosure comprising providing a recirculating stream of air from and to said enclosure, adding a stream of fresh air to said recirculating stream, and thereafter cooling the fresh air portion of the united stream and some of the recirculated portion thereof, to a lower temperature than that of the remainder of said recirculated portion, and utilizing the sensible heat of the warmer portion of the recirculated stream for the purpose of raising the dry-bulb temperature of the cooled portion of the united air stream.

9. The method of conditioning a stream of air of increasing absolute humidity or temperature from one side to the other, comprising dehumidifying or cooling a unitary fractional part only of said stream on the relatively humid side thereof, and varying the sectional area of said part without impeding the flow of any sectional part of said stream by other means than that inherent in the action of the cooling means, to maintain a desired mean humidity standard for said stream.

10. The method of cooling a stream of air drawn from two different sources, the united stream having a higher temperature on one side than on the opposite side, comprising cooling a fractional part of said united stream on the higher temperature side thereof, and varying the cross sectional area of said fractional part subjected to cooling, responsive to variations in a condition of one of said source streams, without impeding the flow of any sectional part of said united stream by other means than that inherent in the cooling means.

11. The method of cooling the air contents of an enclosure comprising providing a recirculating stream of air from and to said enclosure, adding a stream of fresh air to said recirculating stream, thereafter cooling a fractional part only of the united stream on the fresh air side thereof, and varying the cross sectional area of said fractional part by varying the area presented by the cooling medium to said united air stream, responsive to variations in a condition of said recirculating stream withdrawn from said enclosure.

12. The method of air conditioning an enclosure which consists in drawing fresh air from the outdoor atmosphere in desired volume, withdrawing return air from the enclosure, passing said outdoor air and return air through a conditioner in a plurality of separate streams, conditioning at least one of the streams passing through the conditioner, a remaining stream passing through the conditioner being substantially unaffected in temperature and absolute humidity, increasing the number of streams which are conditioned in response to increases in heat load, mixing the conditioned and other streams of air and discharging the resultant mixture into the enclosure.

13. The method of air conditioning an enclosure which consists in drawing fresh air from the outdoor atmosphere in desired volume, withdrawing return air from the enclosure, passing said fresh air and said return air in a plurality of streams through a plurality of conditioning zones, subjecting different numbers of said streams passing through said zones to the action of conditioning medium in accordance with variations in heat load, subjecting at least one of said streams to the action of conditioning medium at all times, mixing said streams of air subsequent to their passage through said zones and supplying said air mixture to said enclosure.

THOMAS CHESTER.